Jan. 10, 1939.                F. A. COLE                2,143,300
                              CLUTCH
                        Filed June 14, 1937          3 Sheets-Sheet 1

Inventor
Frank A. Cole
By Mason Fenwick & Lawrence
Attorneys

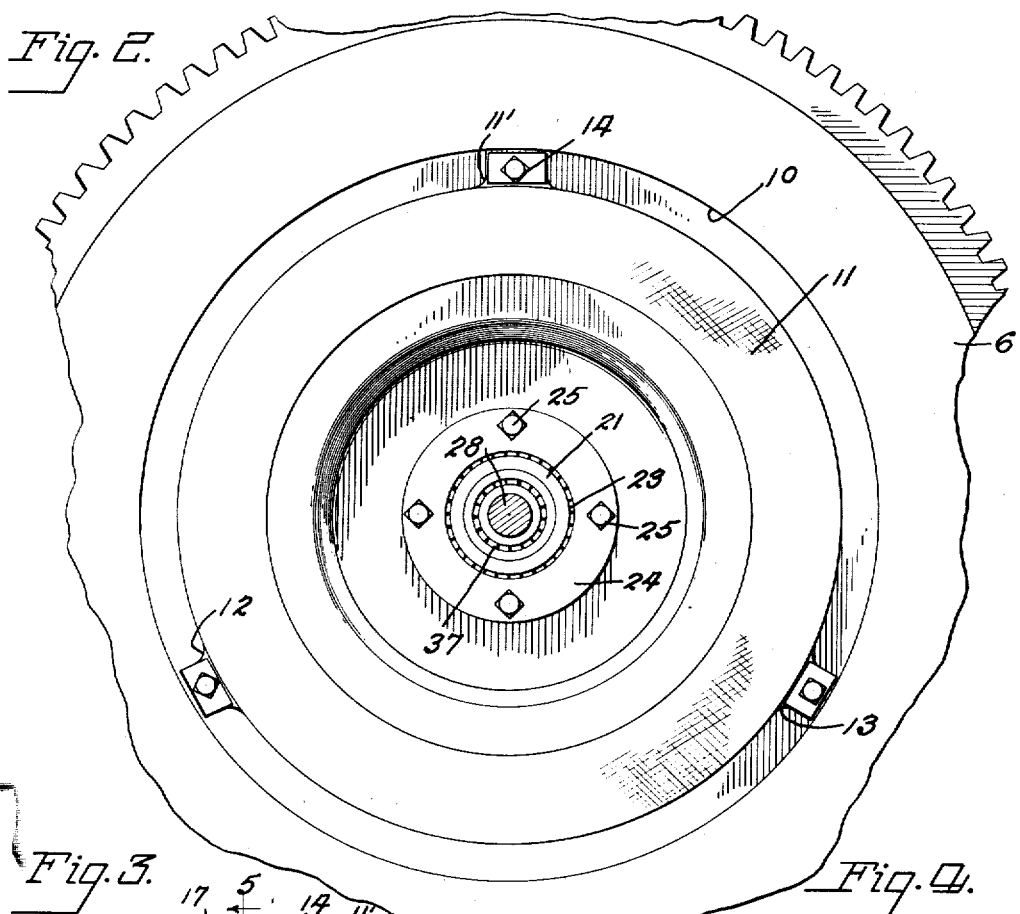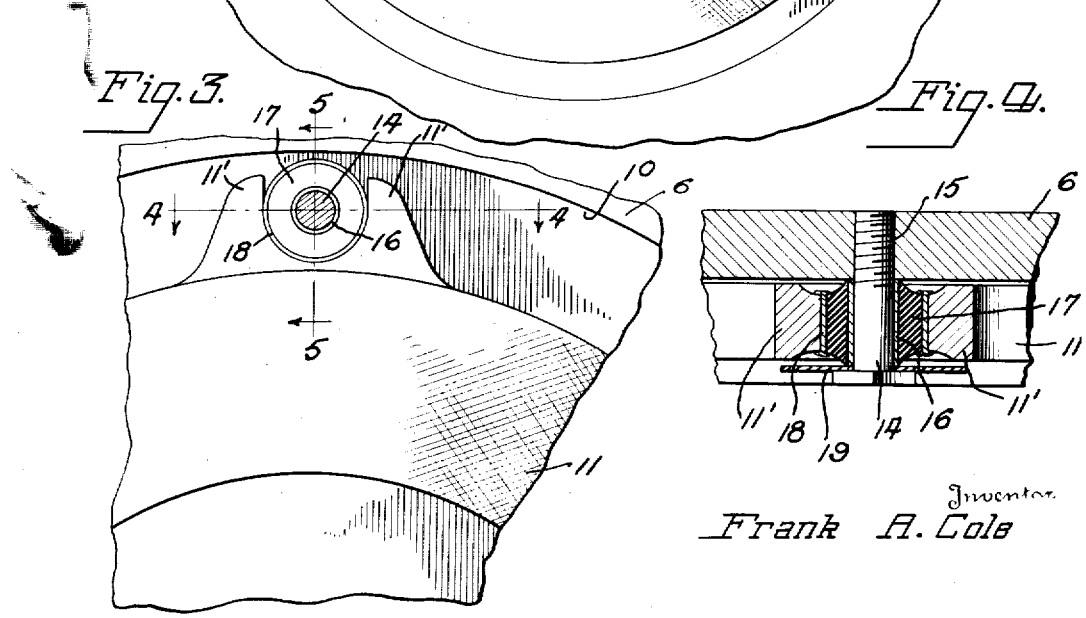

Jan. 10, 1939.  F. A. COLE  2,143,300
CLUTCH
Filed June 14, 1937   3 Sheets-Sheet 3

Inventor
Frank A. Cole
By Mason Fenwick & Lawrence
Attorneys

Patented Jan. 10, 1939

2,143,300

UNITED STATES PATENT OFFICE 2,143,300

CLUTCH

Frank A. Cole, Pittsburgh, Pa.

Application June 14, 1937, Serial No. 148,155

11 Claims. (Cl. 192—68)

This invention relates to clutches of the disk or plate type such as are commonly used on automobiles to effect the connection of the crank or drive shaft of the automobile engine with the driven shafts used to transmit movement to the automobiles.

The main object of the invention is to provide a clutch of this general type with an auxiliary universally mounted clutch plate designed to take up the shock involved in a connection of the driven shaft with the driving shaft of the automotive system.

Another object of the invention is to provide a clutch in which the engagement between the clutch plate and the flywheel connected to the crank shaft is effected in such manner as to compensate automatically for variations in wear of the linings or for improper alinement of the clutch plate.

Other objects of the invention will become apparent as the detailed description thereof proceeds.

In the drawings:

Figure 2 is a fragmentary vertical section taken on the line 2—2 of Figure 1;

Figure 3 is a fragmentary detail, to an enlarged scale, illustrating the flexible connection between the auxiliary abutment plate and the flywheel;

Figure 4 is the section taken on the line 4—4 of Figure 3;

Figure 1:
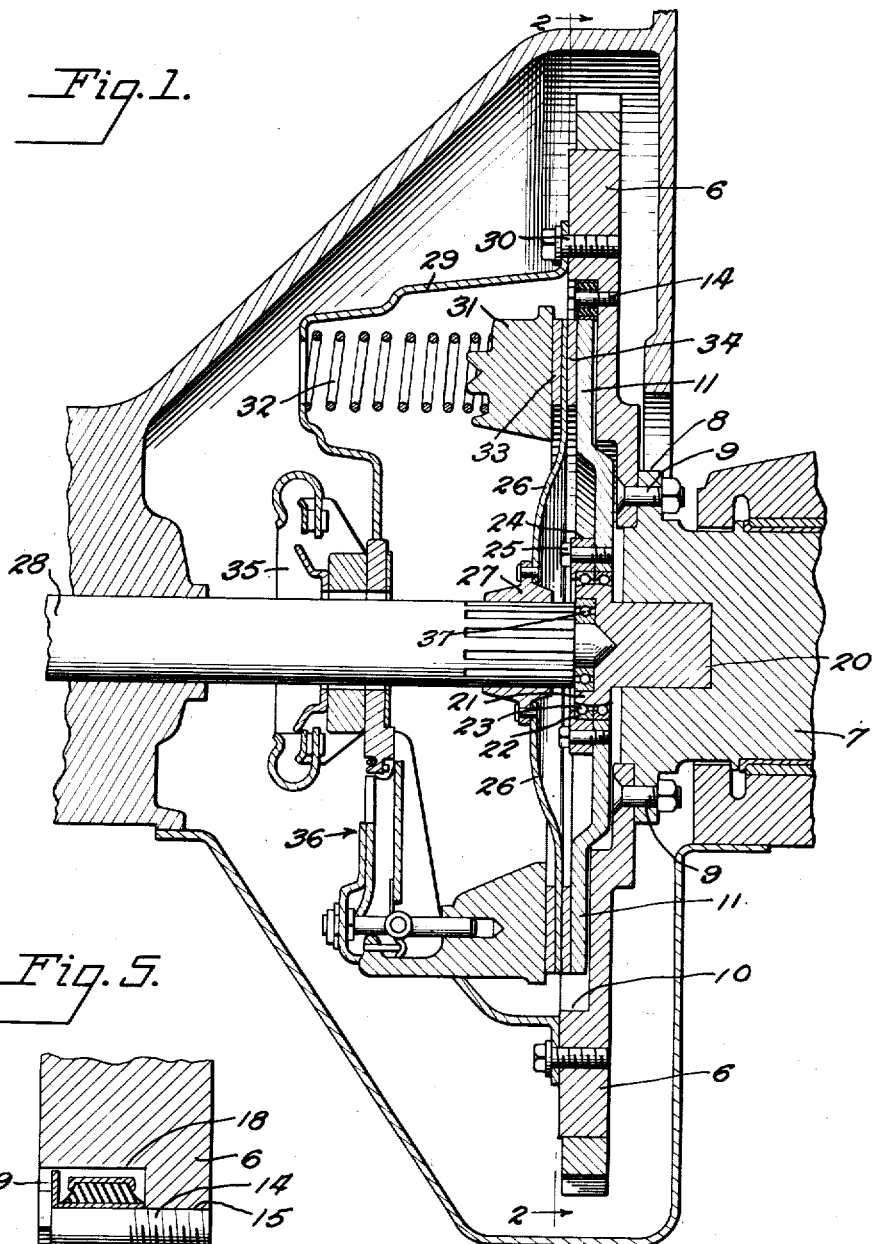
Figure 1 is a fragmentary central vertical section through a clutch constructed in accordance with the present invention.

As shown in Figures 1–5 in the drawings, the invention comprises a flywheel 6 suitably apertured at its center to seat in a recess formed in the end of the crank shaft 7, which is provided with the usual flange 8 to which the flywheel is secured, as by means of bolts 9. The flywheel 6 is provided with a circular recess 10 to form a housing for the auxiliary abutment plate 11. The plate 11 is yieldingly secured to the flywheel 6 by means of the equi-angularly spaced pairs of lugs 11', 12 and 13. Since the connections between each of these pairs of lugs and the flywheel are identical in construction, only one will be described in detail.

Figure 5:
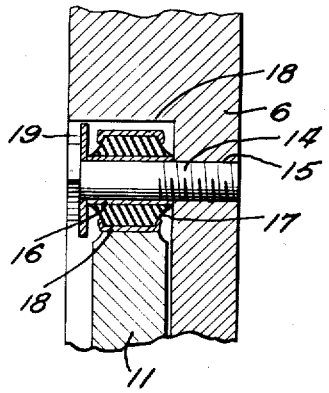
Figure 5 is a section taken on the line 5—5 of Figure 3.

As shown in Figures 3, 4 and 5 of the drawings, the lugs 11' are connected to the flywheel 6 by means of a cap screw 14, screwthreaded into an internally screwthreaded aperture 15, in the flywheel 6. A sleeve 16 surrounds the shank of the screw 14 and has one end thereof seated against the face of the flywheel 6. The sleeve 16 has a second sleeve 17, of rubber or other suitable resilient material vulcanized thereto; and the sleeve 17 has an outer sleeve 18 vulcanized thereto. A washer 19 is interposed between the head of the cap screw 14 and the outer end of the sleeve 16. The construction is such that when pressure is applied to the plate 11, the rubber sleeve 17 will permit the aforesaid plate 11 to yield at its periphery in the direction of the flywheel 6.

To permit the plate 11 to move without distortion at its periphery with respect to the flywheel, this plate 11 is mounted to rock about a spherical bearing at its center. The bearing for the plate 11 comprises in part, a stub shaft 20 driven into an axial recess formed in the crank shaft 7. The stub shaft 20 is provided with a flange 21 having its outer surface spherical, with the center of the sphere lying in the axis of the crank shaft at its intersection with a plane parallel to and centrally located between the opposite sides of the plate 11.

The raceway 22 for the balls 23, is suitably secured to the plate 11 by means of the flanged washer 24 and the bolts 25. It will be apparent from the inspection of Figure 1 of the drawings that the plate 11 is adapted to rotate in all directions about its spherical bearing flange 21. In other words, the plate 11, in addition to the slight yielding movement about the axis of the shafts, due to its resilient connections to the flywheel 6, can also rock laterally in any direction about the center of the sphere having its surface coincident with the spherical surface of the flange 21.

The clutch plate 26 is secured as usual to a hub 27 splined to the driven shaft 28. The clutch cover 29 is suitably secured, as by cap screws 30, to the flywheel 6. The pressure ring 31 arranged within the cover 29 is normally pressed against the lining 33 of the clutch plate 26 by means of a series of compression springs 32 (only one of which appears in the drawings).

As shown in Figure 1 of the drawings, the clutch plate 26 is provided on its opposite sides with the usual linings 33 and 34 to contact normally with the pressure ring 31 and the plate 11, respectively. Pressure applied in the well known manner to the clutch collar 35, operates through the conventional clutch release mechanism 36 to release the clutch when desired. A ball bearing 37 is used to support the inner end of the driven shaft 28 rotatably and in axial alinement with the driving shaft 7.

Attention is directed to the fact that the auxiliary plate 11 forms, in effect, a part of the flywheel. The universal mounting of the auxiliary plate, and its yielding connection at its periphery to the flywheel proper, provide an automatic adjustment for variation in frictional contact which would ordinarily arise from improper alinement of the clutch plate, and from uneven wear in the clutch linings. The yielding connections between the periphery of the auxiliary plate and the flywheel, materially lessen the shock of contact between the driving and driven elements of the clutch.

Figure 6:
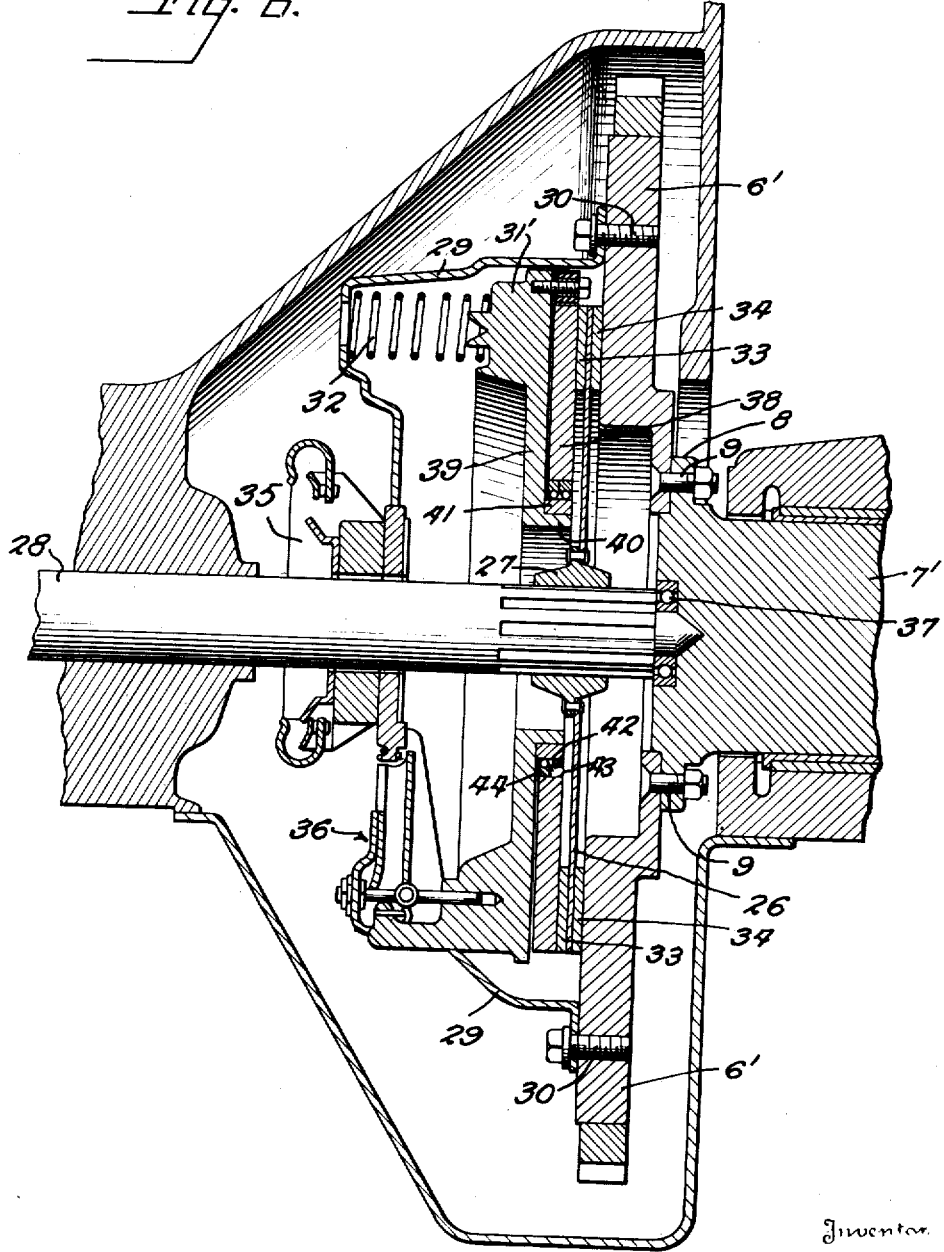
Figure 6 is a fragmentary central vertical section through a modified form of the invention.

In the form of the invention shown in Figure 6, the auxiliary plate 38 is yieldingly secured to the pressure ring 31' by equiangularly spaced pairs of lugs similar to those shown in Figures 1–5, and cap screws 14. The ring 31' has an inwardly directed disk flange 39 formed integral therewith; and the inner edge of this flange 39 is provided with an annular flange 40 coaxial with the shafts 7' and 28.

The flange 40 forms a seat for the sleeve 41 having a spherical face 42 forming a support for the balls 43. The raceway 44 for the balls 43 is suitably secured to the pressure plate 38 by any suitable means. The other elements of this form of the invention are the same as those shown in Figures 1–5, and are designated in Figure 6 by the same reference numerals.

The operation of this form of the invention is substantially the same as that of the form shown in Figure 1 with the auxiliary pressure plate carried by the pressure ring instead of the flywheel.

It is to be understood that the invention is not to be considered as limited to the details of construction illustrated and described herein, nor in any way except as defined by the claims appended hereto.

What I claim is:

1. In a clutch, driving and driven shafts, a flywheel fixed to said driving shaft, a plate pivoted to rock about a fixed point on the axis of said driving shaft and yieldingly connected to said flywheel, and means secured to the driven shaft and normally in engagement with said plate for transmitting the rotations of the driving shaft to the driven shaft through said plate.

2. In a clutch, driving and driven shafts rotatable in axial alinement with each other, a flywheel fixed to the driving shaft and having a recess formed in one face thereof, a plate seated in said recess and pivoted to rock about a fixed point on the axis of said driving shaft, yielding means connecting the periphery of the plate to said flywheel, and means secured to said driven shaft and normally in engagement with said plate to transmit the rotations of the driving shaft to the driven shaft.

3. In a clutch, driving and driven shafts, rotatable in axial alinement with each other, a flywheel fixed to the driving shaft and having a circular recess formed in one face thereof concentric with the axis of said shafts, a circular plate seated in said recess, a spherical bearing connecting said plate to said driving shaft for universal rotation thereon, yielding means connecting the periphery of the plate to said flywheel to provide slight axial and angular movements of the periphery of said plate with respect to said flywheel, and means connected to the driven shaft for transmitting the rotation of the driving shaft through said flywheel and plate to said driven shaft.

4. In a clutch, driving and driven shafts rotatable in axial alinement with each other, a flywheel fixed to said driving shaft, a plate, means for mounting said plate to rotate and rock universally about a fixed point in the axis of said driving shaft, yielding means connecting the periphery of said plate to said flywheel, to provide for movement of the periphery toward and from said flywheel and angularly around the axis thereof, and means connected to the driven shaft and normally in engagement with said plate for transmitting the rotation of the driving shaft through said flywheel and plate to the driven shaft.

5. In a clutch, driving and driven shafts rotatable in axial alinement with each other, means for transmitting the rotation of the driving shaft to the driven shaft including a flywheel, and a plate, a spherical bearing connecting said plate to the driving shaft, and means connecting the periphery of said plate yieldingly to the adjacent face of the flywheel to provide for slight axial and angular movement thereof relative to the flywheel.

6. In a clutch, a driving shaft, a flywheel fixed to said shaft, a plate, yielding means connecting the plate to said flywheel and slightly spaced apart therefrom, a spherical ball bearing connecting said plate to said shaft, a driven shaft, and means connecting said plate and driven shaft to transmit the rotation of the driving shaft thereto.

7. In a clutch, a driving shaft, a driven shaft, means for transmitting the rotations of the driving shaft to the driven shaft, said means including a flywheel fixed at its center to the driving shaft, a plate pivoted at its center to rock universally about the axis of said driving shaft, and yielding means connecting the periphery of the plate to said flywheel.

8. In a clutch, driving and driven shafts rotatable in axial alinement with each other, a flywheel fixed to the driving shaft, a ring having a recess formed in one face thereof, means fixed to said flywheel and supporting said pressure ring for axial and rotating movements with respect to the axis of said driven shaft, a plate seated in said recess, yielding means connecting the periphery of the plate to said ring, and means secured to said driven shaft and normally in engagement with said plate to transmit the rotations of the driving shaft to the driven shaft.

9. In a clutch, driving and driven shafts rotatable in axial alinement with each other, a flywheel fixed to the driving shaft, a pressure ring having a recess formed in one face thereof, means fixed to said flywheel and supporting said pressure ring for axial and rotating movements with respect to the axis of said driven shaft, a circular plate seated in said recess, a spherical bearing connecting said plate to said ring for universal rotation thereon, yielding means connecting the periphery of the plate to said ring to provide slight axial and angular movements of the periphery of said plate with respect to said ring, and means connected to the driven shaft for transmitting the rotation of the driving shaft through said flywheel and plate and ring to said driven shaft.

10. In a clutch, driving and driven shafts rotatable only in axial alinement with each other, a flywheel fixed to said driving shaft, a plate, means for mounting said plate to rotate and rock universally about a fixed point in the common axis of said shafts, and means connected to the driven shaft and normally in engagement with said plate for transmitting the rotation of the driving shaft through said flywheel and plate to the driven shaft.

11. In a clutch, alined driving and driven shafts, a flywheel fixed to the driving shaft, a clutch plate splined to the driven shaft, a pressure ring having an annular flange projecting toward said clutch plate, means fixed to said flywheel and supporting said pressure ring for axial and rotating movements with respect to the axis of said driven shaft, a plate interposed between said ring and clutch plate and mounted for universal rocking movement about said flange, and yielding means connecting the periphery of said plate to said ring.

FRANK A. COLE.